United States Patent
Wang et al.

(10) Patent No.: US 11,548,091 B2
(45) Date of Patent: Jan. 10, 2023

(54) PRETREATMENT OF WELD FLANGES TO MITIGATE LIQUID METAL EMBRITTLEMENT CRACKING IN RESISTANCE WELDING OF GALVANIZED STEELS

(71) Applicant: GM GLOBAL TECHNOLOGY OPERATIONS LLC, Detroit, MI (US)

(72) Inventors: Pei-chung Wang, Troy, MI (US); Michael J. Karagoulis, Okemos, MI (US); Spyros P. Mellas, Waterford, MI (US); Zhenke Teng, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 463 days.

(21) Appl. No.: 16/598,474

(22) Filed: Oct. 10, 2019

(65) Prior Publication Data
US 2021/0107086 A1   Apr. 15, 2021

(51) Int. Cl.
*B23K 11/16*   (2006.01)
*B23K 11/11*   (2006.01)
(Continued)

(52) U.S. Cl.
CPC .......... *B23K 11/163* (2013.01); *B23K 11/115* (2013.01); *B23K 11/20* (2013.01); *B23K 2103/20* (2018.08)

(58) Field of Classification Search
CPC ... B23K 11/115; B23K 11/163; B23K 11/166; B23K 11/20; B23K 11/34; B23K 2103/20
(Continued)

(56) References Cited

U.S. PATENT DOCUMENTS

2008/0302768 A1* 12/2008 Mazumder ........... B23K 26/244
                                                                  219/121.64
2009/0011269 A1*  1/2009 Urushihara ............ B23K 11/20
                                                                  219/119
(Continued)

FOREIGN PATENT DOCUMENTS

CN        101043968 A        9/2007
CN        104227212 A       12/2014
(Continued)

OTHER PUBLICATIONS

L. He et al., Suppression of liquid metal embrittlement in resistance spot welding of TRIP steel, Science and Technology of Welding and Joining, Jan. 31, 2019, pp. 1-8, ISSN: 1362-1718 (print), 1743-2936 (online), The Institute of Materials, Minerals and Mining, Taylor & Francis Group.

(Continued)

*Primary Examiner* — Dana Ross
*Assistant Examiner* — Joseph W Iskra
(74) *Attorney, Agent, or Firm* — Harness, Dickey & Pierce, P.L.C.

(57) ABSTRACT

A method of forming an assembly includes providing a metallic first workpiece having base and a first layer disposed on the base and adhering a second layer onto the first layer. One of the first and second layers is formed of a zinc-based material formed of at least a majority of zinc, and the other of the first and second layers is formed of a metallic alloying material having a melting point higher than the melting point of the zinc-based material. Preferably, the first layer is formed of the zinc-based material, and the second layer is formed of the metallic alloying material with the higher melting point. A metallic second workpiece is disposed in contact with the second layer. A welding operation (Continued)

is performed to join the first workpiece to the second workpiece. A welded assembly is also provided.

17 Claims, 2 Drawing Sheets

(51) Int. Cl.
*B23K 11/20* (2006.01)
*B23K 103/20* (2006.01)

(58) Field of Classification Search
USPC .......................................................... 219/118
See application file for complete search history.

(56) References Cited

U.S. PATENT DOCUMENTS

| | | |
|---|---|---|
| 2012/0193331 A1 | 8/2012 | Carlson et al. |
| 2020/0016679 A1* | 1/2020 | Wang .................. B23K 11/163 |

FOREIGN PATENT DOCUMENTS

| | | |
|---|---|---|
| CN | 107521183 | * 12/2017 |
| CN | 107530820 A | 1/2018 |
| CN | 110711932 A | 1/2020 |
| CN | 112643181 A | 4/2021 |
| DE | 102020125019 A1 | 4/2021 |
| JP | H04147774 A | 5/1992 |
| JP | H06142941 A | 5/1994 |
| WO | 2018203126 A1 | 11/2018 |

OTHER PUBLICATIONS

U.S. Appl. No. 16/034,712, titled "Pretreatment of Weld Flanges to Mitigate Liquid Metal Embrittlement Cracking in Resistance Welding of Galvanized Steels," filed Jul. 13, 2018 by GM Global Technology Operations LLC.
First Office Action for Chinese Patent Application No. 202011071456.9 dated Dec. 28, 2021, with correspondence dated Jan. 19, 2022, from China Patent Agent (H.K.) Ltd. summarizing contents; 15 pages.

* cited by examiner

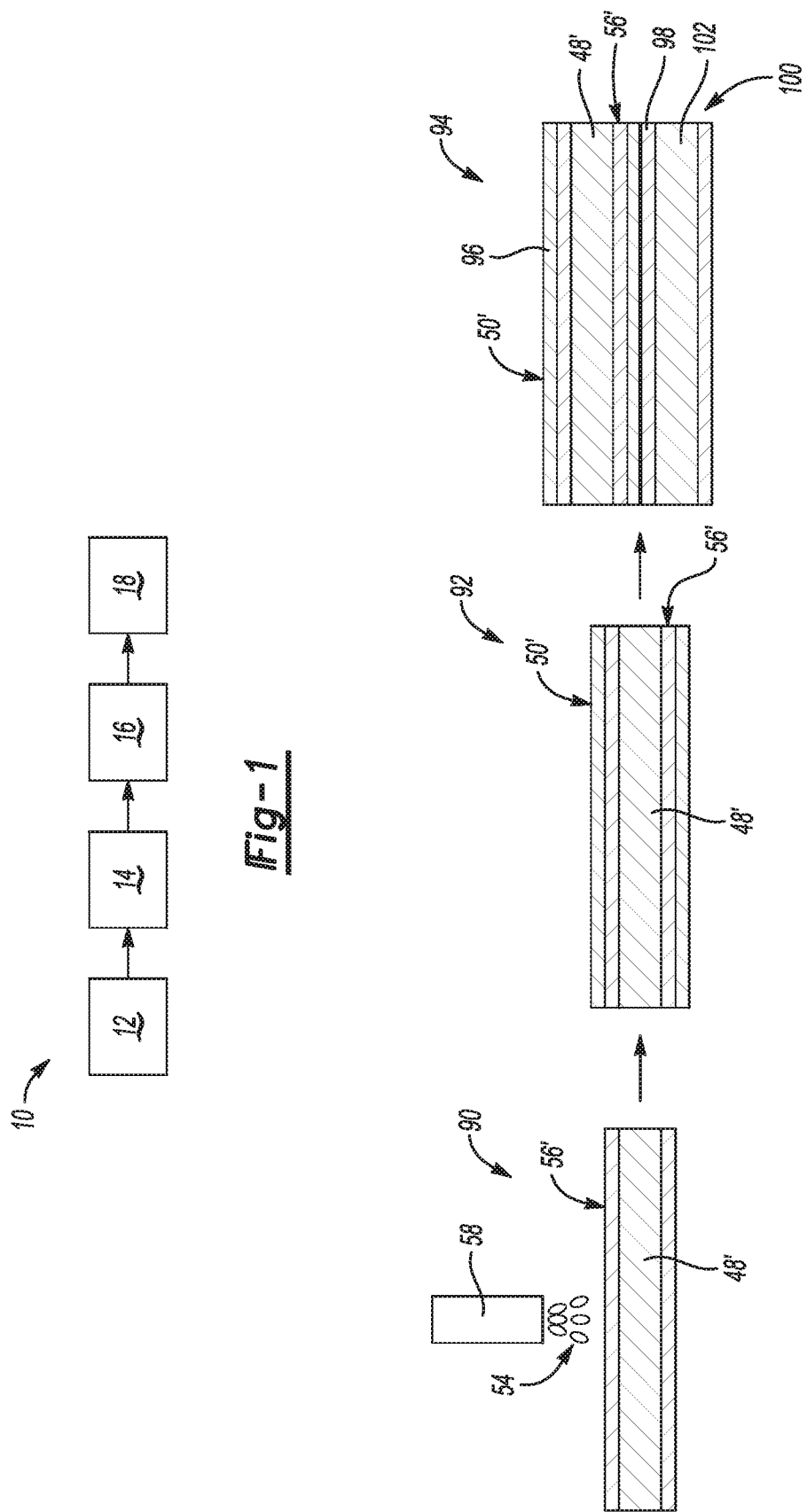

PRETREATMENT OF WELD FLANGES TO MITIGATE LIQUID METAL EMBRITTLEMENT CRACKING IN RESISTANCE WELDING OF GALVANIZED STEELS

The present disclosure relates to welding, including resistance welding of galvanized steels of ferritic, austenitic, or complex multiple phase microstructure.

Automobile vehicles utilize high strength steel (HSS), such as generation 3 HSS, as structural members, such as load beam reinforcements, B pillar reinforcements, roof rail inner reinforcements, front roof header and bow roof members, panel body side sill reinforcements, reinforcement front and rear rails, and reinforcement floor cross members. The use of HSS in these applications allows predetermined deformation to occur during impact, such as during collisions. Generation 3 HSS is a steel having retained austenite and a tensile strength (MPa)×% elongation 25,000. High strength steel including generation 3 HSS is normally coated with a coating such as zinc to act as a galvanic protective layer to minimize oxidation of the steel. It is desirable to join steel components including generation 3 HSS using rapid welding techniques such as resistance welding, which locally elevates temperatures at the weld sites to approximately 1500 degrees Celsius or higher. When zinc coated HSS components are welded, liquid zinc, which melts at approximately 400 degrees Celsius, interacts with the steel, which together with the strains and stresses from heatup and cooldown of the workpieces occurring during resistance welding can cause liquid metal embrittlement (LME) cracking. Figures illustrating LME cracking were included in the patent application having Ser. No. 16/034,712 filed on Jul. 13, 2018, which is herein incorporated by reference in its entirety.

Liquid metal embrittlement, also known as liquid metal induced embrittlement, is a phenomenon where certain ductile metals experience drastic loss in tensile ductility or undergo brittle fracture when exposed to specific liquid metals. The practical significance of LME occurs for several steels which experience ductility losses and cracking during hot-dip galvanizing or during subsequent fabrication such as during welding. For example, cracking adjacent to or in the weld joint can occur in HSS galvanized steels during resistance welding when molten zinc of the galvanic protection coating acts to induce cracks in the base steel material.

Thus, while current zinc-coated generation 3 HSS components achieve their intended purpose of improving formability and energy absorption, there is a need for a new and improved system and method for pretreatment to mitigate liquid metal embrittlement cracking in resistance welding of galvanized steels.

SUMMARY

The present disclosure provides a method for pretreatment to mitigate liquid metal embrittlement cracking in welding of coated steels, including galvanized, galvannealed, and ZAM (zinc, aluminum, magnesium alloy) steels. The method includes layering a zinc-based material and another metallic material having a higher melting point than zinc, such as an aluminum-based or nickel-based material, on at least one face of a steel member to create a first workpiece. A second workpiece is disposed adjacent to the layered face, and the first and second workpieces are then welded together. Upon application of the welding heat, the zinc and the other metallic material alloy together to substantially prevent the zinc from penetrating into the grain boundaries of the workpieces. The alloying of the zinc and the other metallic material alloy may also first occur when the metallic alloying material is being applied in molten form.

In one form, a method of forming an assembly is provided, which includes providing a metallic first workpiece having base and a first layer disposed on the base. The method includes adhering a second layer onto the first layer. One of the first and second layers is formed of a zinc-based material formed of at least a majority of zinc, and the other of the first and second layers is formed of a metallic alloying material having a melting point higher than a melting point of the zinc-based material. The method further includes disposing a metallic second workpiece in contact with the second layer and performing a welding operation to join the first workpiece to the second workpiece.

In another form, which may be combined with or separate from the other forms disclosed herein, a method to mitigate liquid metal embrittlement cracking in resistance welding of coated steels is provided. The method includes providing a first workpiece having steel base and a first layer disposed on the base. The first layer is formed of at least a majority of zinc. The method includes spraying a second layer onto the first layer. The second layer is formed of a metallic alloying material having a melting point higher than a melting point of the first layer. The method further includes disposing a metallic second workpiece in contact with the second layer of the first workpiece and performing a resistance welding operation to join the first workpiece to the second workpiece.

In yet another form, which may be combined with or separate from the other forms disclosed herein, a welded assembly is provided that includes first and second workpieces. The first workpiece includes a steel member, a first layer applied to at least one face of the steel member, and a second layer adhered to the first layer. One of the first and second layers is formed of a zinc-based material formed of at least a majority of zinc, and the other of the first and second layers is formed of a metallic alloying material having a melting point higher than a melting point of the zinc-based material. The second workpiece is metallic and is joined to the first workpiece by a weld joint that is formed of an alloy of the first layer and the second layer.

Additional features may optionally be provided, including but not limited to the following: the metallic alloying material being formed of a majority of aluminum or a majority of nickel; the first layer being formed of the zinc-based material and the second layer being formed of the metallic alloying material; the second layer having a thickness in the range of 0.01 mm to 0.5 mm; wherein the step of adhering the second layer onto the first layer includes thermal spraying the second layer onto the first layer; wherein thermal spraying the second layer onto the first layer includes heating the metallic alloying material to a temperature above 400 degrees Celsius; the zinc-based material including at least one of the following alloying elements: antimony, aluminum, bismuth, cobalt, gold, iron, lead, magnesium, mercury, nickel, silver, sodium, tellurium, and tin; the metallic alloying material being an aluminum alloy formed of a majority of aluminum; the aluminum alloy being Aluminum 1100 or Aluminum 4043; and the base and the second workpiece being formed of steel, where the steel is a mild strength steel, a high strength steel, or an advanced high strength steel.

In some forms, the first layer may also include at least one of the following: a) gunmetal including copper, tin, and zinc: b) bronze defining one of Ormolu and Gilt Bronze having copper and zinc; c) an alloy including copper, aluminum, and zinc; d) an alloy including copper, aluminum, zinc, and tin; e) a nickel alloy including nickel, copper, and zinc; f) a solder having zinc, lead, and tin; and g) a zinc alloy having zinc, aluminum, magnesium, and copper.

Further additional features may also include: modifying at least one face of the second workpiece prior to disposing the metallic second workpiece in contact with the second layer of the first workpiece by applying a zinc-based layer to the face and optionally spraying a metallic alloying layer onto the zinc-based layer, where the metallic alloying layer has a melting point higher than a melting point of the zinc-based layer. The zinc-based material may be directly applied onto the steel member, and the alloying material may be subsequently applied onto the zinc-based material layer.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a block diagram illustrating a method of forming an assembly, in accordance with the principles of the present disclosure;

FIG. 3 is an assembly flow diagram implementing a version of the method of FIG. 1, which varies from the implementation shown by FIGS. 2A-2F, according to the principles of the present disclosure.

DETAILED DESCRIPTION

The following description is merely exemplary in nature and is not intended to limit the present disclosure or its application or uses.

Figure 2A:
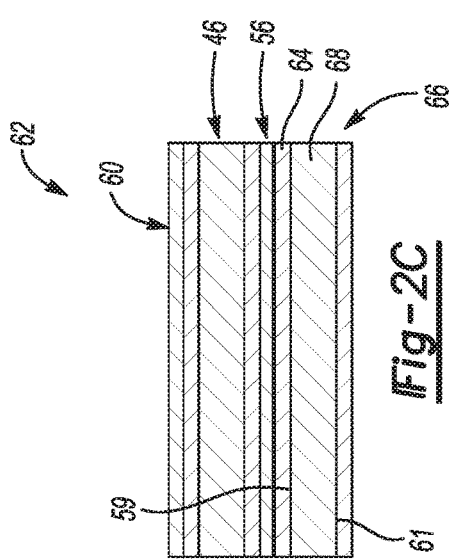
FIG. 2A is a schematic cross-sectional view of a workpiece have a first layer formed of a zinc-based material disposed thereon, in accordance with the principles of the present disclosure.

Referring now to FIGS. 1 and 2A, a method of forming an assembly is provided and generally indicated at 10. The method 10 is a method to mitigate liquid metal embrittlement cracking in resistance welding of coated steels, including galvanized, galvannealed, and ZAM (zinc, aluminum, magnesium alloy) steels. The method 10 includes a step 12 of providing a metallic first workpiece 46 having base 48 and a first layer 50 disposed on the base 48. The first layer 50 may be disposed on one or both opposed faces 51, 53 of the base 48.

The base 48 is a metal sheet made of steel, for example, an advanced high strength steel, such as generation 3 high strength steel, another high strength steel, or a mild strength steel. The coating layer 50 may be pre-applied onto the base 48 for galvanic protection of the steel base material. The coating layer 50 may have a thickness t1 ranging from 0.005 mm up to 0.08 mm, by way of example. The coating layer 50 may be zinc-based and formed of a majority of zinc, or it may be formed of another metallic material, as will be described in further detail below.

It has been discovered that by addition of another metallic layer onto the layer 50, which may be formed of zinc to create a galvanized steel workpiece 48 prior to welding, during the subsequent welding process, the "free zinc" coating of the zinc layer 50 becomes molten at approximately 400 degrees Celsius and alloys with second metallic layer. This alloying process draws the zinc coating away from the surfaces 51, 53 of the steel base 48 before the molten zinc has a chance to crack the steel via the liquid metal embrittlement (LME) mechanism. According to the present disclosure, the zinc and the other metal together alloy to form a mixed metal in one or more phases, which raises the melting point from that of zinc if the melting point of the other metal by itself is higher than the melting point of zinc. The increase in melting point together with the alloying process draws away the zinc material from the surfaces 51, 53 of the steel 48 and prevents LME or significantly reduces LME of the steel. The present method is effective to prevent or significantly reduce LME in relevant automotive steels including when used in coated (e.g., galvanized and galvannealed) HSS steels such as generation 3 HSS.

Figure 2B:
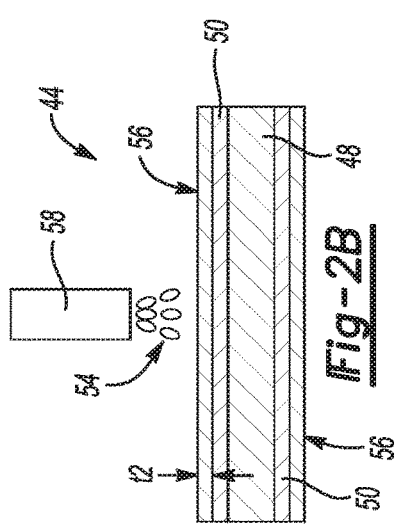
FIG. 2B is a schematic cross-sectional view of an apparatus applying a thermal spray coating onto the workpiece of FIG. 2A, to form a second layer thereon, according to the principles of the present disclosure.

Therefore, referring now to FIG. 2B, and with continued reference to FIG. 1, the method 10 includes a step 14 of adhering a second layer 56 onto the first layer 50. As will be described in further detail below, one of the first and second layers 50, 56 is formed of a zinc-based material formed of at least a majority of zinc, and the other of the first and second layers 50, 56 is formed of a metallic alloying material having a melting point higher than a melting point of the zinc-based material. In a preferred example, the first layer 50 is formed of the zinc-based material to galvanically protect the steel base 48, and the second layer 56 is formed of the metallic alloying material.

In one form, molten droplets of the metallic alloying material 54 are thermally sprayed or applied onto the coating layer 50 of the workpiece 46, thereby creating a deposition layer, or second layer 56. The metallic alloying material 54 may be applied by additive manufacturing such as by a thermal spraying device 58, or the metallic alloying material 54 can be applied using a mechanical method. The metallic alloying material 54 may be any metallic alloying material having a higher melting point than the zinc-based layer 50. In a preferred example, the metallic alloying material 54 is formed of an aluminum or aluminum alloy containing a majority of aluminum, or of nickel or a nickel alloy containing a majority of nickel. For example, the metallic alloying material could be 1xxx, 4xxx, or 5xxx series aluminum. In some forms, the metallic alloying material is formed of Aluminum 1100, and in other forms, the metallic alloying material is formed of Aluminum 4043. As with the first layer 50, the second layer 56 may be formed over one or both faces 51, 53 of the steel sheet base 48.

The second layer 56 may have a thickness t2 ranging from 0.01 mm up to 0.5 mm, by way of example. In some examples, the thermal spray application of the metallic alloying material 54 is conducted at an elevated temperature, for example, above 400 degrees Celsius, to improve adhesion of the alloying metallic material to the zinc, and to start the binding process of zinc with the alloying material 54 prior to the welding operation. In some forms, the alloying material 54 may alloy with the zinc layer 50 by virtue of the second layer 56 being applied at the elevated temperature during the thermal spray process.

Figure 2C:
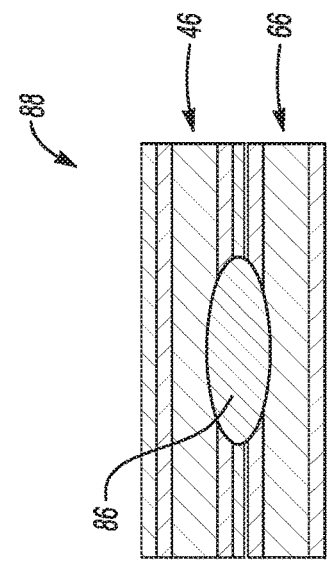
FIG. 2C is a schematic cross-sectional view of a multiple workpiece stack-up including the workpiece of FIG. 2B and another workpiece disposed thereon with the first and second layers disposed therebetween, according to the principles of the present disclosure.

Referring now to FIG. 2C and with continued reference to FIG. 1, the method 10 includes a step 16 of disposing a metallic second workpiece 66 in contact with the second layer 56 of the first workpiece 46. In this example, the second workpiece 66 also has an underlying steel sheet base 68 and a zinc coating 64 disposed on one or both of the faces 59, 61 of the steel sheet base 68. The metal sheet 68 can be formed, for example, of a steel, such as, but not limited to, generation 3 HSS, or a lower strength steel which may or may not be susceptible to the LME mechanism.

In the illustrated example, the first workpiece 46 is positioned with its second layer 56 brought into direct contact with a zinc coating layer 64 of the second workpiece 66. The second layer 56 of the first workpiece 46 is disposed into contact with the outermost layer of the second workpiece 66 to promote alloying of the zinc-based material and the other alloying material (e.g., the nickel-based or aluminum-based material). In the illustrated example, the outermost layer of the second workpiece 66 is the zinc-based layer 64, but the second workpiece 66 could also include its own second layer formed over its first layer 64, where one of the layers would be formed of a zinc-based material, and the other of the layers would be formed of an alloying material having a melting point higher than that of the zinc-based material.

Figure 2D:
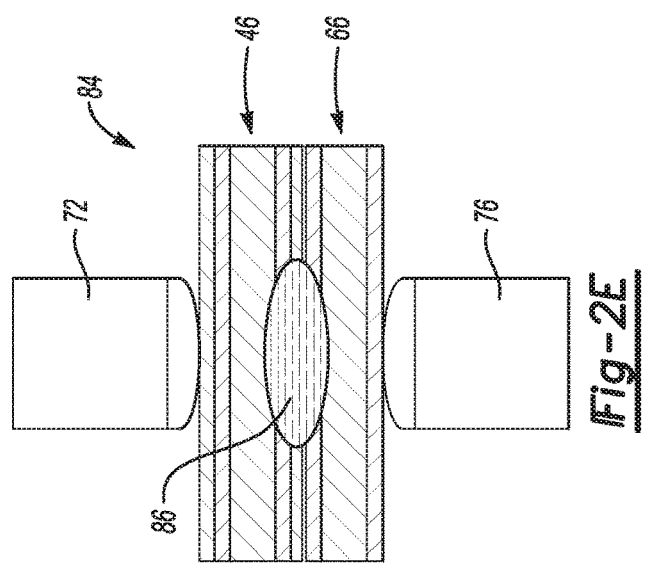
FIG. 2D is a schematic cross-sectional of view of the multiple workpiece stack-up of FIG. 2C, having a pair of electrodes disposed on each side of the stack-up, according to the principles of the present disclosure.

Referring now to FIG. 2D, and with continued reference to FIG. 1, the method 10 includes a step 18 of performing a welding operation to join the first workpiece 46 to the second workpiece 66. In the illustrated example, a first electrode 72 is brought into contact with an outer surface 74 of the first workpiece 46, and a second electrode 76 is brought into contact with an oppositely directed outer surface 78 of the second workpiece 66. A first force 80 is then applied by the first electrode 72 and an oppositely directed second force 82 is applied by the second electrode 76 to force the first workpiece 46 into abutment with the second workpiece 66.

Figure 2E:
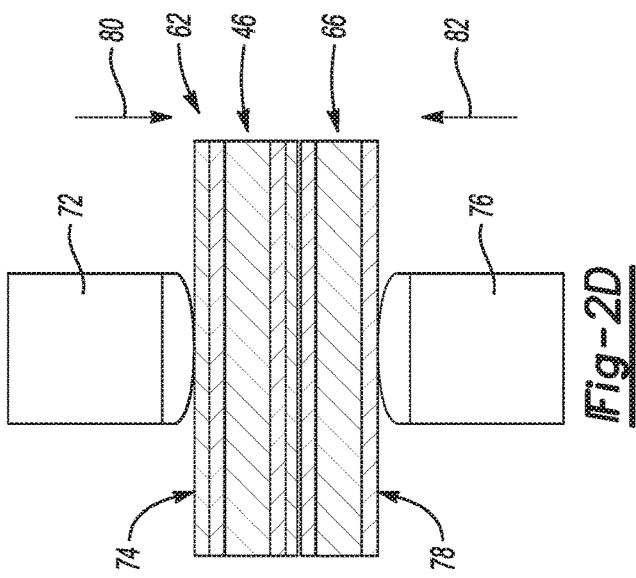
FIG. 2E is a schematic cross-sectional view of the multiple workpiece stack-up of FIGS. 2C-2D, having the pair of electrodes of FIG. 2D disposed on each side of the stack-up, and with a weld nugget formed within the workpieces, according to the principles of the present disclosure.

Referring now to FIG. 2E, a resistance welding current is applied by the first electrode 72 and across the second electrode 76 through the first workpiece 46 and the second workpiece 66 to create a weld joint 86. During formation of the weld joint 86, the zinc in one or both of the coating layers 50, 64 melts and alloys with the metallic alloying material 54 of the second layer 56 to form an alloy of the zinc and the metallic alloying material 54.

Figure 2F:
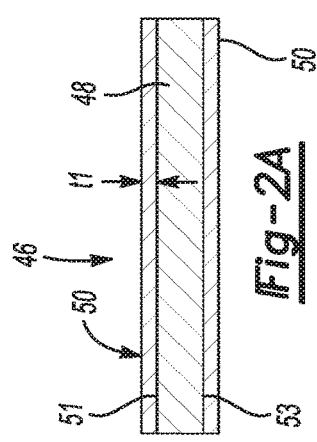
FIG. 2F is a schematic cross-sectional view of a bonded assembly formed by joining the stack-up of FIGS. 2C-2E, in accordance with the principles of the present disclosure.

Referring to FIG. 2F, following the welding step 18 and after cooling of the weld joint 86, a resistance welded assembly 88 is completed.

In some examples, the zinc-based material may contain a majority of zinc and one or more of the following elements: antimony, aluminum, bismuth, cobalt, gold, iron, lead; magnesium, mercury; nickel, silver, sodium; tellurium, and tin. The zinc-based material; which may be used for the first layer 50, may also include: Bronze—Gunmetal (copper, tin; zinc); Bronze—Ormolu (Gilt Bronze) (copper, zinc); Devarda's alloy—(copper, aluminum, zinc), Nordic gold—(copper, aluminum, zinc, tin); Nickel alloy—German silver (nickel, copper, zinc); Solder—(zinc, lead, tin); and Zinc alloy—Zamak (zinc, aluminum, magnesium, copper). Silicon Bronze as noted herein may have a composition of approximately 96% Copper, 3% silicon and 1% Manganese.

Referring to FIG. 3 and with continued reference to FIGS. 2A-2F, another version of the assembly includes the material layers applied to create a workpiece 90, where the workpiece 90 differs from the workpiece 46 by reversing the layers. For example, starting with the metal sheet 48' made of steel, the molten droplets of the metallic alloying material 54 are sprayed or applied directly onto the metal sheet 48' such that the first deposition layer 56' directly contacts the metal sheet 48'. Subsequently, in a coating step 92 the coating layer 50' of zinc-based material is applied onto the metallic alloying material of the first deposition layer 56'. An assembly operation creates a welding subassembly 94 similar to the welding subassembly 62. The welding subassembly 94 is created having the metal sheet 48' positioned with the coating layer 50' (or alternately an outside facing coating layer 96) brought into direct contact with a zinc coating layer 98 of a second workpiece 100. The second workpiece 100 includes a metal sheet 102 which can be for example a steel, such as, but not limited to, generation 3 HSS, a lower strength steel, or a carbon steel. A welding operation similar to that described above with reference to FIGS. 2D-2E is then performed to create a resistance welded assembly (not shown).

The method 10 to mitigate liquid metal embrittlement cracking in resistance welding of coated steels, including galvanized, galvannealed, and ZAM (zinc, aluminum, magnesium alloy) steels of the present disclosure offers several advantages. These include the beneficial effect of alloying the zinc coating with another material, e.g., nickel, aluminum, or the like, so the zinc element does not penetrate into the grain boundaries of the steel to form LME cracks during resistance welding of galvanized steels. The alloying process can also advantageously begin between the zinc in the galvanized coating and the alloying material (e.g., the nickel or aluminum layer) during the thermal spraying process prior to resistance welding. The alloying process also occurs between the zinc in the galvanized coating with the metallic alloying material layer during the resistance welding process.

Although the present disclosure is described in reference to resistance welding, the method of the present disclosure can also be applied to all fusion welding processes, including arc welding processes, laser welding processes and the like. The method of the present disclosure is also applicable for fusion welding of multiple workpieces.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of forming an assembly, the method comprising:
    providing a metallic first workpiece having a steel sheet base and a first layer disposed on the steel sheet base;
    adhering a second layer onto the first layer, one of the first and second layers being formed of a zinc-based material formed of at least a majority of zinc, and the other of the first and second layers being formed of a metallic alloying material having a melting point higher than a melting point of the zinc-based material, wherein the metallic alloying material is an aluminum alloy formed of a majority of aluminum;

disposing a metallic second workpiece in contact with the second layer; and performing a welding operation to join the first workpiece to the second workpiece.

2. The method of claim 1, further comprising providing the first layer as being formed of the zinc-based material and the second layer as being formed of the metallic alloying material.

3. The method of claim 2, further comprising providing the second layer having a thickness in the range of 0.01 mm to 0.5 mm.

4. The method of claim 1, wherein the step of adhering the second layer onto the first layer includes thermal spraying the second layer onto the first layer.

5. The method of claim 4, wherein the step of thermal spraying the second layer onto the first layer includes heating the metallic alloying material to a temperature above 400 degrees Celsius.

6. The method of claim 1, further comprising providing the zinc-based material including at least one of the following alloying elements: antimony, aluminum, bismuth, cobalt, gold, iron, lead, magnesium, mercury, nickel, silver, sodium, tellurium, and tin.

7. The method of claim 1, wherein the aluminum alloy is Aluminum 1100 or Aluminum 4043.

8. The method of claim 1, wherein the steel sheet base and the second workpiece are formed of a mild strength steel, a high strength steel, or an advanced high strength steel.

9. A method to mitigate liquid metal embrittlement cracking in resistance welding of coated steels, the method comprising:

providing a first workpiece having a steel sheet base and a first layer disposed on the steel sheet base, the first layer formed of at least a majority of zinc;

spraying a second layer onto the first layer, the second layer being formed of a metallic alloying material having a melting point higher than a melting point of the first layer;

disposing a metallic second workpiece in contact with the second layer of the first workpiece; and performing a resistance welding operation to join the first workpiece to the second workpiece.

10. The method of claim 9, wherein the first layer comprises:

a) gunmetal including copper, tin, and zinc;
b) bronze including copper and zinc;
c) a first alloy including copper, aluminum, and zinc;
d) a second alloy including copper, aluminum, zinc, and tin;
e) a nickel alloy including nickel, copper, and zinc;
f) a solder including zinc, lead, and tin; or
g) a zinc alloy including zinc, aluminum, magnesium, and copper.

11. The method of claim 9, further comprising modifying at least one face of the metallic second workpiece prior to disposing the metallic second workpiece in contact with the second layer of the first workpiece by applying a zinc-based layer to the at least one face of the metallic second workpiece.

12. The method of claim 9, wherein the metallic alloying material is formed of a majority of aluminum or a majority of nickel.

13. The method of claim 12, further comprising:

providing the second layer having a thickness in the range of 0.01 mm to 0.5 mm; and providing the first layer including at least one of the following alloying elements: antimony, aluminum, bismuth, cobalt, gold, iron, lead, magnesium, mercury, nickel, silver, sodium, tellurium, and tin.

14. A welded assembly comprising:

a first workpiece having:
  a steel member;
  a first layer applied to at least one face of the steel member;
  a second layer adhered to the first layer, one of the first and second layers being formed of a zinc-based material formed of at least a majority of zinc, and the other of the first and second layers being formed of a metallic alloying material having a melting point higher than a melting point of the zinc-based material, wherein the metallic alloying material is an aluminum alloy formed of a majority of aluminum; and a metallic second workpiece joined to the first workpiece by a weld joint comprising an alloy of the first layer and the second layer, wherein the steel member and the second workpiece are formed of a mild strength steel, a high strength steel, or an advanced high strength steel.

15. The welded assembly of claim 14, the first layer being formed of the zinc-based material and the second layer being formed of the metallic alloying material.

16. The welded assembly of claim 15, wherein the zinc-based material includes at least one of the following alloying elements: antimony, aluminum, bismuth, cobalt, gold, iron, lead, magnesium, mercury, nickel, silver, sodium, tellurium, and tin.

17. The welded assembly of claim 16, wherein the second workpiece is coated with a zinc-based material formed of a majority of zinc.

* * * * *